(12) United States Patent
Kim

(10) Patent No.: US 9,321,499 B2
(45) Date of Patent: Apr. 26, 2016

(54) BICYCLE FRAME AND BICYCLE, AND BABY CARRIAGE USING SAME CAPABLE OF TWO-WHEEL AND THREE-WHEEL CONVERSION

(71) Applicant: Jung Keon Kim, Namyangju (KR)

(72) Inventor: Jung Keon Kim, Namyangju (KR)

( * ) Notice: Subject to any disclaimer, the term of this patent is extended or adjusted under 35 U.S.C. 154(b) by 0 days.

(21) Appl. No.: 14/511,248

(22) Filed: Oct. 10, 2014

(65) Prior Publication Data
US 2015/0021877 A1  Jan. 22, 2015

Related U.S. Application Data

(63) Continuation of application No. PCT/KR2013/003013, filed on Apr. 11, 2013.

(30) Foreign Application Priority Data

Apr. 12, 2012 (KR) .......................... 10-2012-0037671
Apr. 9, 2013 (KR) .......................... 10-2013-0038452

(51) Int. Cl.
*B62K 9/00* (2006.01)
*B62K 13/04* (2006.01)
(Continued)

(52) U.S. Cl.
CPC .................. *B62K 13/04* (2013.01); *B62B 7/044* (2013.01); *B62B 7/12* (2013.01); *B62B 7/142* (2013.01);
(Continued)

(58) Field of Classification Search
CPC .......... B62K 13/04; B62B 7/044; B62B 7/12; B62B 7/142
USPC ...................................... 280/282, 7.1, 87.041
See application file for complete search history.

(56) References Cited

U.S. PATENT DOCUMENTS 2,212,741 A * 8/1940 Johnson .......................... 280/7.1
3,485,507 A * 12/1969 Christof ......................... 280/202
(Continued)

FOREIGN PATENT DOCUMENTS

CN  2928655 Y  8/2007
CN  2931261 Y  8/2007
(Continued)

OTHER PUBLICATIONS

European Search Report for European Patent Application No. 13775471.9, dated Oct. 27, 2015 (9 pages).
(Continued)

*Primary Examiner* — Joseph Rocca
*Assistant Examiner* — Marlon Arce
(74) *Attorney, Agent, or Firm* — Mintz Levin Cohn Ferris Glovsky and Popeo, P.C.; Peter F. Corless

(57) ABSTRACT

A cycle frame easily converted from a bicycle to a tricycle and vice versa, and to a cycle and a baby carriage using same. The cycle includes a main frame including a main support and a pair of sub-supports branching from the main support, a pair of conversion frames, front end portions thereof being hingeably connected to rear end portions of the sub-supports such that the distance between rear end portions thereof is adjustable, a pair of connection brackets respectively connected to the rear end portions of the conversion frames, a fork frame rotatably connected to the front end portion of the main support, a front wheel shaft rotatably connected to the fork frame, a main rear wheel shaft, both ends thereof being respectively and separably connected to the connection brackets, and a propelling pedal rotatably mounted on the main support and drive-connected to the main rear wheel shaft.

11 Claims, 23 Drawing Sheets

(51) Int. Cl.
*B62K 19/18* (2006.01)
*B62B 7/04* (2006.01)
*B62B 7/12* (2006.01)
*B62B 7/14* (2006.01)
*B62K 9/02* (2006.01)

(52) U.S. Cl.
CPC ... *B62K 9/00* (2013.01); *B62K 9/02* (2013.01); *B62K 19/18* (2013.01); *B62B 2205/006* (2013.01); *B62B 2206/006* (2013.01)

(56) References Cited

U.S. PATENT DOCUMENTS

| | | | |
|---|---|---|---|
| 3,532,351 A * | 10/1970 | Kaufman | 280/7.15 |
| 5,556,116 A * | 9/1996 | Sloss et al. | 280/7.15 |
| 6,105,997 A | 8/2000 | Watkins | |
| 6,685,207 B1 * | 2/2004 | Blake | 280/282 |
| 6,811,173 B1 | 11/2004 | Shih | |
| 7,597,331 B2 * | 10/2009 | Schulte et al. | 280/7.15 |
| 7,878,522 B2 * | 2/2011 | Liao | 280/282 |
| 8,439,385 B2 * | 5/2013 | Baron | 280/288.4 |
| 9,067,633 B2 * | 6/2015 | Bell | |
| 2003/0141693 A1 * | 7/2003 | Wu | 280/263 |
| 2006/0175109 A1 * | 8/2006 | Cheng | 180/219 |
| 2008/0258426 A1 * | 10/2008 | Kanou | 280/282 |
| 2008/0277890 A1 * | 11/2008 | Boster et al. | 280/62 |

FOREIGN PATENT DOCUMENTS

| | | |
|---|---|---|
| CN | 201761587 U | 3/2011 |
| CN | 102267519 A | 12/2011 |
| DE | 10036997 C2 | 11/2001 |
| EP | 0782948 A2 | 7/1997 |
| FR | 635938 A | 3/1928 |
| JP | S48-27838 A | 4/1973 |
| JP | 2006-224960 A | 8/2006 |
| JP | 2009-202702 A | 9/2009 |
| KR | 20-2008-0005728 U | 11/2008 |
| KR | 10-0942442 B1 | 2/2010 |
| WO | 2004/067352 A1 | 8/2004 |
| WO | 2014/044994 A1 | 3/2014 |

OTHER PUBLICATIONS

Extended European Search Report for European Patent Application No. 13775471.9, dated Jan. 8, 2016, 17 pages.

* cited by examiner

BICYCLE FRAME AND BICYCLE, AND BABY CARRIAGE USING SAME CAPABLE OF TWO-WHEEL AND THREE-WHEEL CONVERSION

CROSS-REFERENCE TO RELATED APPLICATIONS

This is a continuation of International Application No. PCT/KR2013/003013 filed on Apr. 11, 2013, which claims priority to Korean Application Nos. 10-2012-0037671 filed on Apr. 12, 2012 and 10-2013-0038452 filed on Apr. 9, 2013. The applications are incorporated herein by reference.

TECHNICAL FIELD

The present invention relates to a cycle frame as well as a cycle and a baby carriage capable of bicycle-tricycle conversion using the same, and more particularly, to a cycle frame which is easily convertible from bicycle mode into tricycle mode and vice versa as well as a cycle and a baby carriage capable of bicycle-tricycle conversion using the same.

BACKGROUND ART

Generally, a tricycle includes one front wheel having a larger diameter, two rear wheels having a smaller diameter, a saddle disposed at a middle between the front and rear wheels, and a handlebar disposed above the front wheel. These components of the tricycle are connected together via a frame. The tricycle is designed to improve balance during riding compared to a bicycle. Therefore, little children who lack balance, children or beginners who have not ridden a bicycle generally ride a tricycle.

However, as infants or children become older or beginners get accustomed to riding, they change from a tricycle to a bicycle. For this, they additionally purchase a bicycle, which requires an additional cost. In addition, the existing tricycle is not used, and thus must be stored, which is problematic.

As a related-art approach for overcoming this problem, "TRICYCLE CONVERTIBLE INTO BICYCLE (Korean Utility Model Publication 20-2009-0011620)" is disclosed.

The structure of this conventional approach includes two front wheels such that the structure is converted into a bicycle when forks are converged and into a tricycle when the forks are spread. A support rod is coupled to a handle post, and two L-shaped forks, i.e. right and left forks, are movable in the horizontal direction and fixed using a fixing bolt, and the handle post is erected vertically, such that the two front wheels can keep in contact with the ground while rotating.

However, this conventional approach is configured such that the two front wheels are simply moved to the center. The actual function of a bicycle is not properly realized, which is problematic. For instance, the two front wheels which are moved to the center do not properly realize the functions of a bicycle, such as high-speed riding or cornering.

SUMMARY

Accordingly, the present invention has been made keeping in mind the above problems occurring in the prior art, and an object of the present invention is to provide a cycle frame which is easily convertible between bicycle mode and tricycle mode as well as a cycle and a baby carriage capable of bicycle-tricycle conversion using the same.

In order to accomplish the above object, the present invention provides a cycle frame for a cycle capable of bicycle-tricycle conversion that includes: a main frame including a main support on which a saddle is mounted and a pair of sub-supports branching from the main support; a pair of conversion frames, front end portions of the pair of conversion frames being hingeably connected to rear end portions of the pair of sub-supports such that a distance between rear end portions of the conversion frames is adjustable; and a pair of connection brackets respectively connected to the rear end portions of the conversion frames, wherein a rear wheel shaft is fitted into the pair of connection brackets.

Each of the connection brackets may have a first mounting hole and a second mounting hole into which the rear wheel shaft is selectively fitted. Portions of the first mounting hole and the second mounting hole are connected to and communicate with each other.

Each of the connection brackets may include a first bracket plate connected to a corresponding rear end portion of the rear end portions of the conversion frames and a second bracket plate butted to an outer side surface of the first bracket plate, the second bracket plate having a third mounting hole and a fourth mounting hole into which the rear wheel shaft is selectively fitted. The first bracket plate may have at least two first connecting holes extending in a front-rear direction into a shape of a long slot, a bolt being fastened into the first connecting holes, and the second bracket plate may have at least two second connecting holes formed at positions corresponding to the first connecting holes, the bolt being fastened into the second connecting holes, whereby a position where the second bracket plate is fixed to the first bracket plate via the bolt is adjustable in the front-rear direction.

The connection brackets may be connected to the rear end portions of the conversion frames via first hinge units. Each of the first hinge units may include a plurality of first sub-pieces protruding in a direction of thickness from a corresponding rear end portion of the rear end portions of the conversion frames such that the first sub-pieces are spaced apart from each other, the first sub-pieces having first sub-holes in center portions thereof, a plurality of second conversion pieces protruding from a corresponding front end portion of the front end portions of the connection brackets in a direction of thickness such that the first conversion pieces are spaced apart from each other, the second conversion pieces being positioned between the first sub-pieces such that the first conversion pieces overlap the first sub-pieces and having first conversion holes in center portions thereof, and a first holding pin extending through the first sub-holes and the first conversion holes to fix an angle at which a corresponding conversion frame of the conversion frames and a corresponding connection bracket of the connection brackets hinge with respect to each other.

The present invention also provides a cycle capable of bicycle-tricycle conversion that includes: a main frame including a main support on which a saddle is mounted and a pair of sub-supports branching from the main support; a pair of conversion frames, front end portions of the pair of conversion frames being hingeably connected to rear end portions of the pair of sub-supports such that a distance between rear end portions of the conversion frames is adjustable; a pair of connection brackets respectively connected to the rear end portions of the conversion frames; a fork frame rotatably connected to a front end portion of the main support; a front wheel shaft rotatably connected to the fork frame; a main rear wheel shaft, both ends of the main rear wheel shaft being respectively connected to the pair of connection brackets such that the both ends are separable from the connection brackets; and a propelling pedal rotatably mounted on the main support and drive-connected to the main rear wheel shaft.

The cycle capable of bicycle-tricycle conversion may further include a sub-rear wheel shaft, wherein, when converted into tricycle mode, one end of the main rear wheel shaft is rotatably connected to one connection bracket of the pair of connection brackets, the other end of the main rear wheel shaft is separated from the other connection bracket of the pair of connection brackets, and the sub-rear wheel shaft is rotatably connected to the other connection bracket of the pair of connection brackets; and a tricycle shaft, both ends of the tricycle shaft being respectively connected to the main rear wheel shaft and the sub-rear wheel shaft such that the main rear wheel shaft and the sub-rear wheel shaft rotate integrally. The propelling pedal is drive-connected to the main rear wheel shaft via the tricycle shaft and a chain. The propelling pedal may include a propelling sprocket, and the tricycle shaft may include a shaft sprocket drive-connected to the propelling sprocket via the chain.

The present invention also provides a cycle capable of bicycle-tricycle conversion that includes: a main frame including a main support on which a children's seat is mounted and a pair of sub-supports branching from the main support; an auxiliary footing for children mounted below and in front of the children's seat; a pair of conversion frames, front end portions of the pair of conversion frames being hingeably connected to rear end portions of the pair of sub-supports such that a distance between rear end portions of the conversion frames is adjustable; a pair of connection brackets respectively connected to the rear end portions of the conversion frames; a fork frame rotatably connected to a front end portion of the main support; a front wheel shaft rotatably connected to the fork frame; a main rear wheel shaft connected to one connection bracket of the pair of connection brackets; a sub-rear wheel shaft connected to the other connection bracket of the pair of connection brackets; a tricycle shaft, both ends of the tricycle shaft being respectively connected to the main rear wheel shaft and the sub-rear wheel shaft such that the main rear wheel shaft and the sub-rear wheel shaft rotate integrally; and an auxiliary handlebar mounted behind the children's seat, wherein the fork frame is steered using the handlebar via a connecting rod.

The present invention also provides a baby carriage that includes: a main frame including a main support on which a baby carriage seat is mounted and a pair of sub-supports branching from the main support; a pair of conversion frames, front end portions of the pair of conversion frames being hingeably connected to rear end portions of the pair of sub-supports such that a distance between rear end portions of the conversion frames is adjustable; a pair of connection brackets respectively connected to the rear end portions of the conversion frames; an auxiliary wheel rotatably connected to a front end portion of the main support; a first rear wheel connected to one connection bracket of the pair of connection brackets; a second rear wheel connected to the other connection bracket of the pair of connection brackets; and a baby carriage handle mounted on the main frame.

According to the present invention, the following significant effects can be realized.

First, the present invention has an advantage in that conversion from a bicycle into a tricycle and vice versa can be rapidly and easily performed.

Second, since the present invention embodies the cycle that can be converted between bicycle mode and tricycle mode, there is an advantage in that additional cost for purchasing a bicycle can be saved even if the bicycle is required when the cycle is used in tricycle mode.

Third, since the present invention can realize bicycle and tricycle functions through one cycle, there is an advantage in that a space-related problem caused when a tricycle and a bicycle must be separately stored.

Fourth, the present invention has an advantage in that one cycle can be converted into a tricycle for children or a baby carriage.

DETAILED DESCRIPTION

Reference will now be made in detail to exemplary embodiments of the present invention, which are illustrated in the accompanying drawings.

Figure 1:
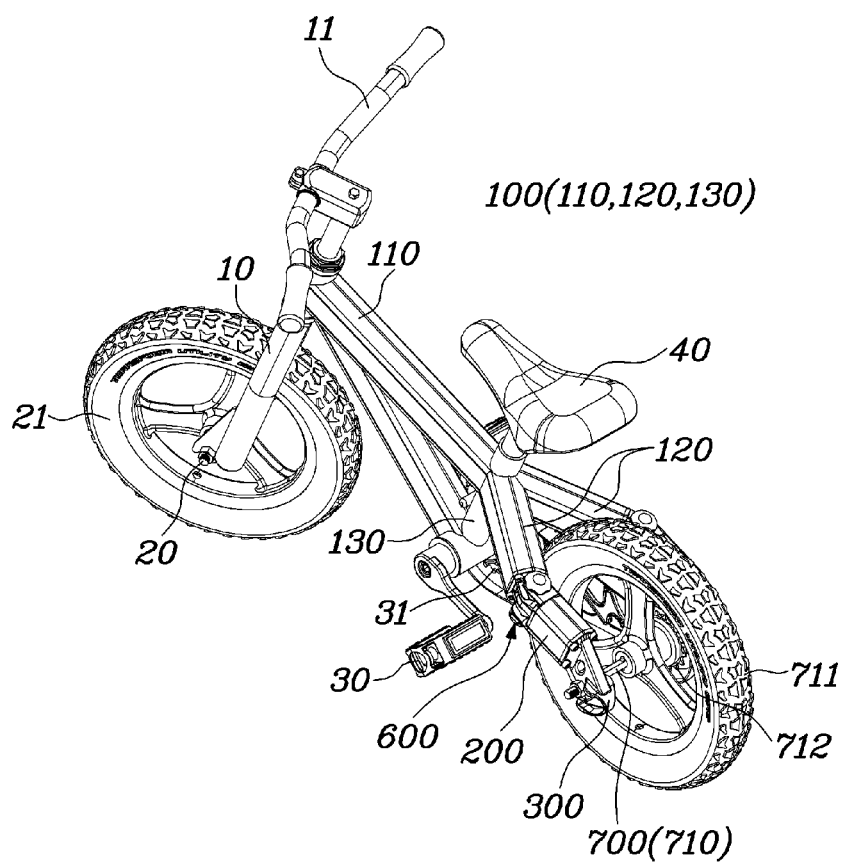
FIG. 1 is a perspective view showing bicycle mode of a cycle capable of bicycle-tricycle conversion according to a first embodiment of the present invention.
Figure 2:
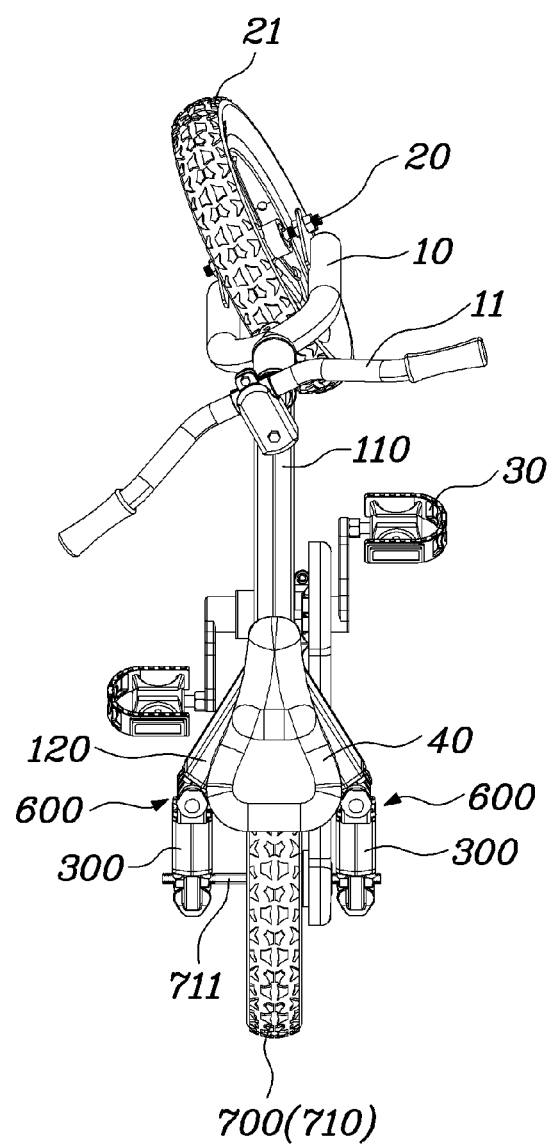
FIG. 2 is a top-plan view showing the bicycle mode of the cycle capable of bicycle-tricycle conversion according to the first embodiment of the present invention.
Figure 3A:
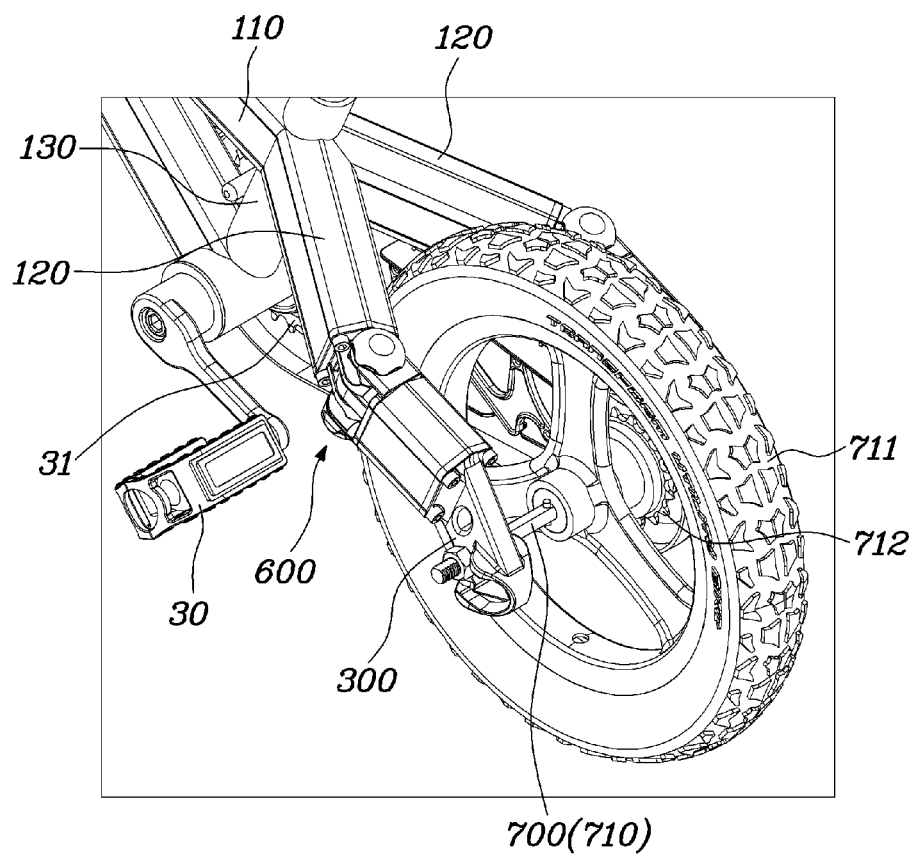
FIG. 3a and FIG. 3b are enlarged and exploded views of key components, showing the bicycle mode of the cycle capable of bicycle-tricycle conversion according to the first embodiment of the present invention.
Figure 3B:
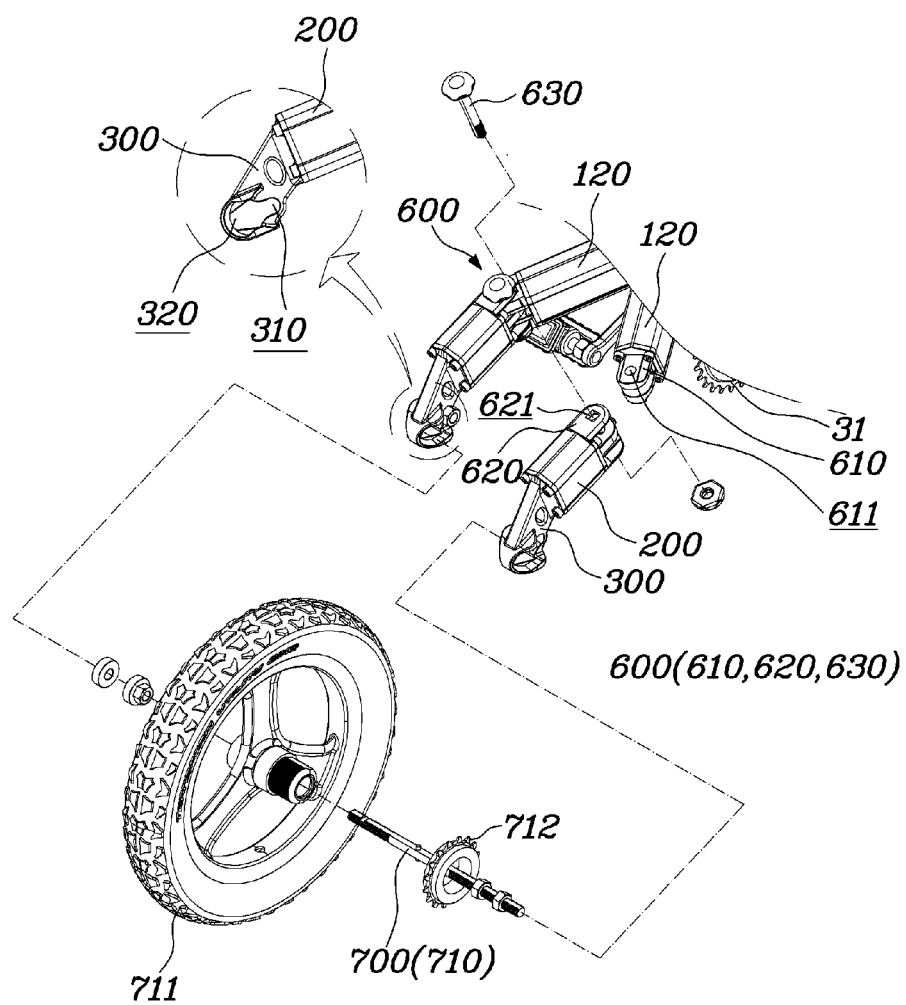
Figure 4:
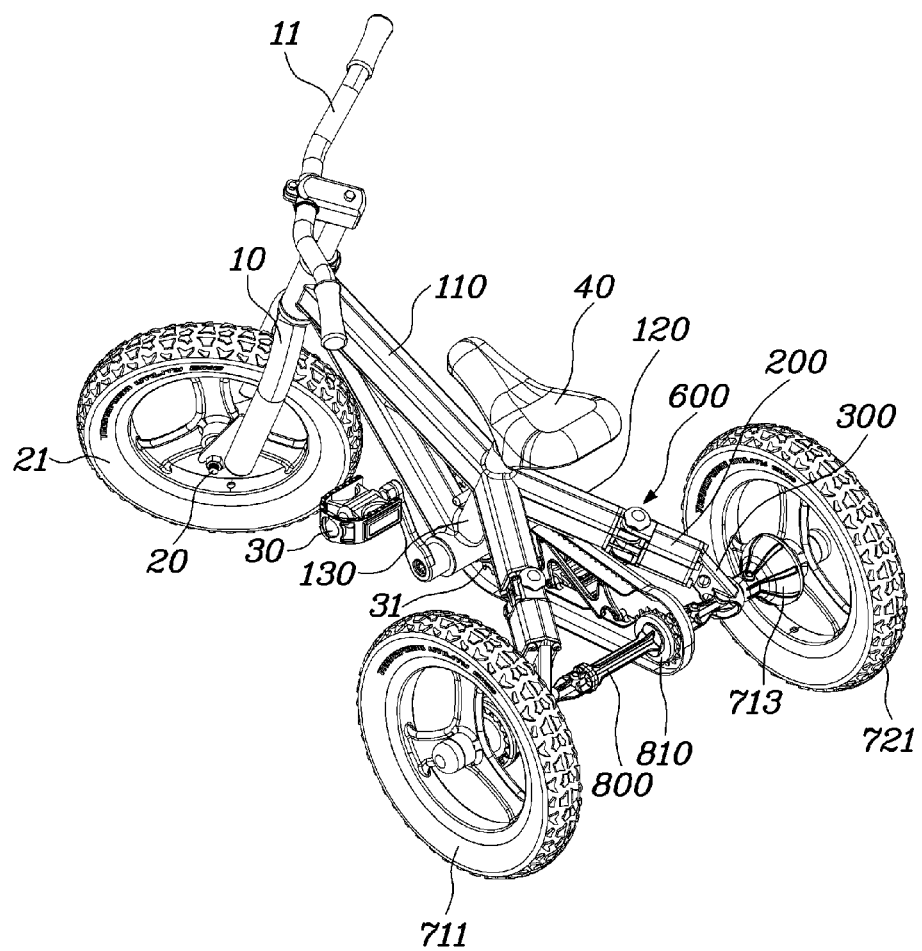
FIG. 4 is a perspective view showing tricycle mode of the cycle capable of bicycle-tricycle conversion according to the first embodiment of the present invention.
Figure 5:
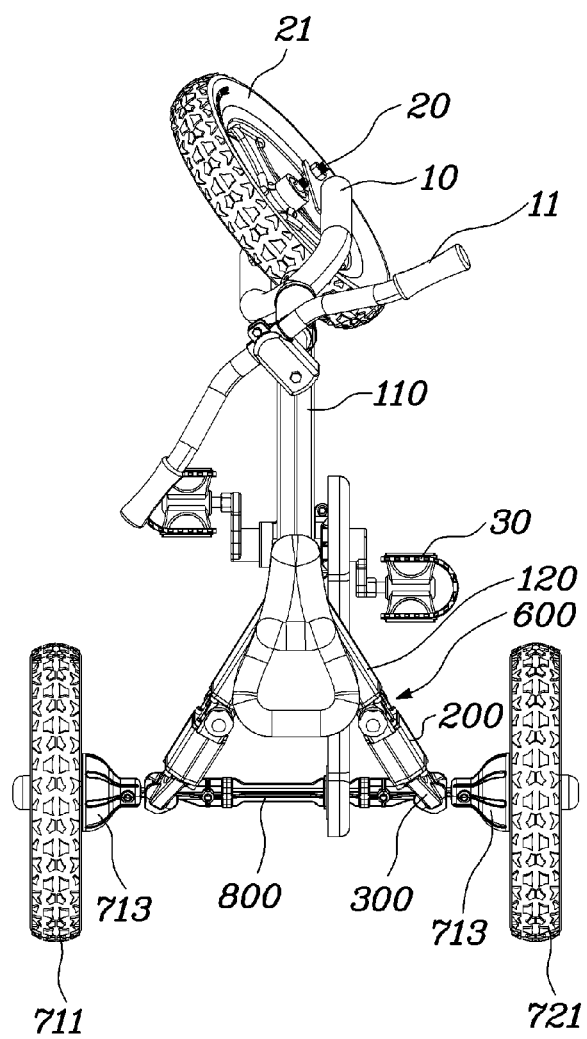
FIG. 5 is a top-plan view showing the tricycle mode of the cycle capable of bicycle-tricycle conversion according to the first embodiment of the present invention.
Figure 6:
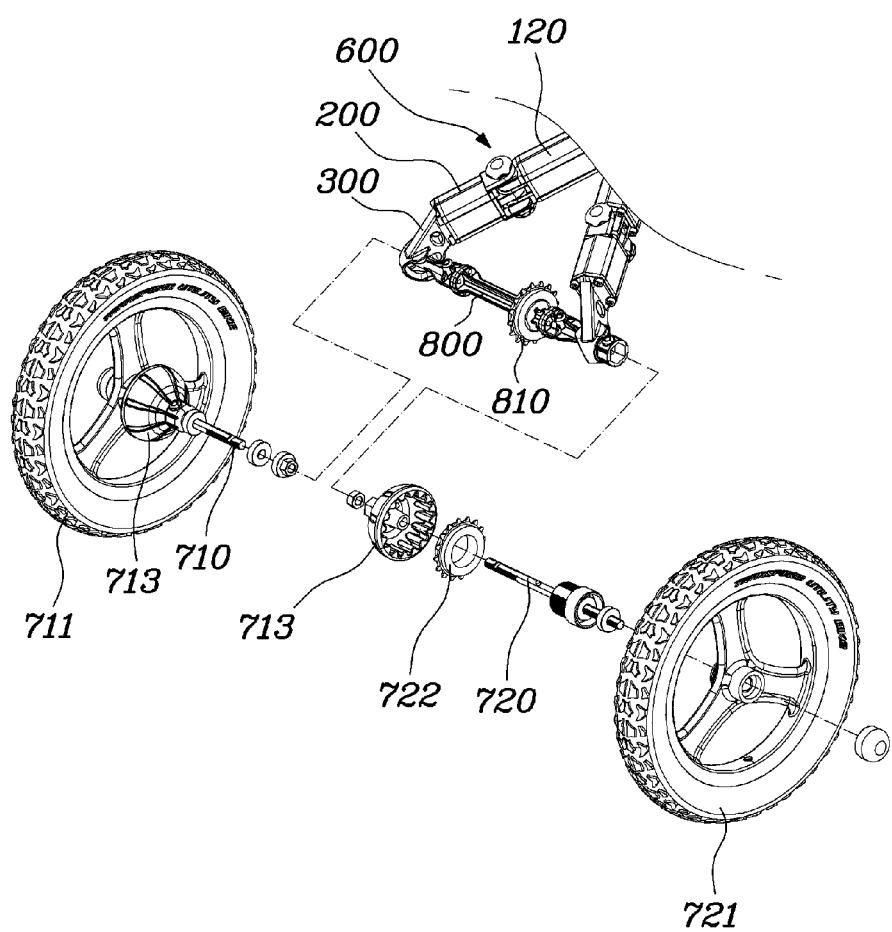
FIG. 6 is an exploded perspective view of key components, showing the tricycle mode of the cycle capable of bicycle-tricycle conversion according to the first embodiment of the present invention.

FIG. 1 is a perspective view showing bicycle mode of a cycle capable of bicycle-tricycle conversion according to a first embodiment of the present invention, FIG. 2 is a top-plan view showing the bicycle mode of the cycle capable of bicycle-tricycle conversion according to the first embodiment of the present invention, FIG. 3a and FIG. 3b are enlarged and exploded views of key components, showing the bicycle mode of the cycle capable of bicycle-tricycle conversion according to the first embodiment of the present invention, FIG. 4 is a perspective view showing tricycle mode of the cycle capable of bicycle-tricycle conversion according to the first embodiment of the present invention, FIG. 5 is a top-plan view showing the tricycle mode of the cycle capable of bicycle-tricycle conversion according to the first embodiment of the present invention, and FIG. 6 is an exploded perspective view of key components, showing the tricycle mode of the cycle capable of bicycle-tricycle conversion according to the first embodiment of the present invention.

As shown in FIG. 1 to FIG. 6, the cycle capable of bicycle-tricycle conversion according to the present invention embodies a cycle that can be easily converted from a bicycle into a tricycle and vice versa.

In order to realize this, the present invention includes a main frame 100, conversion frames 200, connection brackets 300, a fork frame 10, a front wheel shaft 20, a main rear wheel shaft 710, a sub-rear wheel shaft 720, a tricycle shaft 800 and propelling pedals 30.

Specifically, the main frame 100 is a frame that supports the entire structure of the cycle according to the present invention. A saddle 40 is mounted on the upper portion of the main frame 100 such that the height of the saddle can be adjusted, the conversion frames 200 are connected to rear portions of the main frame such that the conversion frames can hinge in the lateral direction, the fork frame 10 is rotatably mounted on the front end portion of the main frame, and the propelling pedals 30 which provide a propelling force to a rear wheel shaft 700 via a propelling sprocket 31 are mounted on the rear portion of the main frame.

Here, a steering handlebar 11 is provided on the upper end of the fork frame 10, and the front wheel shaft 20 having a front wheel 21 is connected to the lower end of the fork frame 10 such that the front wheel shaft can spin. The configurations of the above-mentioned components, including the fork frame 10, the handlebar 11, the front wheel 21, the front wheel shaft 20, the propelling sprocket 31 and propelling pedals 30, are the same as or similar to the configurations of components generally used in a typical cycle, including a fork frame, a handlebar, a front wheel, a front wheel shaft, a propelling sprocket and propelling pedals, and thus detailed descriptions thereof will be omitted.

The main frame 100 includes a main support 110 on which the saddle 40 is mounted via connecting supports 130 and a pair of sub-supports 120 which branch at a preset angle in the lateral direction from the rear end portion of the main support 110. Here, the connecting supports 130 are defined as a plurality of supports which are connected to the main support 110 in order to support some components, such as the saddle 40 and the propelling pedals 30.

The conversion frames 200 are provided as a pair and connect rear wheels 711 and 721 to the main frame 100 via the connection brackets 300, and the front end portions thereof are connected to the respective rear end portions of the sub-supports 120 via first hinge units 600 such that the conversion frames can hinge.

The connection brackets 300 are mounted on the rear end portions of the conversion frames 200 in order to facilitate connection to the rear wheel shaft 700 depending on a change in the angle of the conversion frames when the cycle is converted into a bicycle or tricycle mode. As shown in FIG. 3b, each of the connection brackets 300 is provided with a first mounting hole 310 into which the rear wheel shaft 700 is fitted when the cycle is in bicycle mode and a second mounting hole 320 into which the rear wheel shaft 700 is fitted when the cycle is in tricycle mode. Here, the diameter of the first mount hole 310 and the diameter of the second mount hole 320 can be variously designed corresponding to the outer diameter of the rear wheel shaft 700. Although the first mounting hole 310 and the second mounting hole 320 can be formed in different areas, portions of the first and second mounting holes 310 and 320 according to this embodiment are connected to and communicate with each other such that the first mounting hole 310 and the second mounting hole 320 overlap each other. In addition, it is preferred that the central axes of the first mounting hole 310 and the second mounting hole 320 be misaligned from each other at a preset angle corresponding to a difference in the angle at which the connection bracket 300 and the rear wheel shaft 700 are disposed in the bicycle or tricycle mode.

Each of the first hinge units 600 which connect the conversion frames 200 to the rear end portions of the sub-supports 120 such that the conversion frames can hinge has a hinge structure, including first sub-pieces 610, first conversion pieces 620 and a first holding pin 630.

The first sub-pieces 610 protrude in the direction of thickness from the rear end portions of the sub-supports 120 such that the first sub-pieces are spaced apart from each other, and first sub-holes 611 are formed in the center portions of the first sub-pieces 610. The first conversion pieces 620 protrude from the front end portions of the conversion frames 200 in the direction of thickness such that the first conversion pieces are spaced apart from each other, and are positioned between the first sub-pieces 610 such that the first conversion pieces overlap the first sub-pieces. First conversion holes 621 are formed in the center portions of the first conversion pieces 620. The first holding pin 630 extends through the first sub-holes 611 and the first conversion holes 621, thereby fixing the angle at which the sub-supports 120 and the conversion frames 200 hinge with respect to each other. Here, the first holding pin 630 can be implemented as a bolt having threads on the outer circumference to fix the angle at which the sub-supports 120 and the conversion frames 200 hinge with respect to each other through fastening with a nut.

Accordingly, when converting from the bicycle mode into the tricycle mode or vice versa, the nut is removed from the first holding pin 630 which is inserted into and fixed to the first sub-holes 611 and the first conversion holes 621, the conversion frames 200 are hinged to adjust the angle at which the sub-supports 120 and the conversion frames 200 hinge with respect to each other, and then the nut is fastened with the first holding pin 630.

When the bicycle mode is realized, the pair of conversion frames are arranged parallel to each other at a preset angle with respect to the sub-supports 120 due to manipulation of the first hinge units 600. Accordingly, the pair of connection brackets 300 mounted on the conversion frames 200 are arranged parallel to each other. In this state, both sides of the rear wheel shaft 700 are fitted into the first mounting holes 310 formed in the connection brackets 300.

The rear wheel shaft 700 has a main rear wheel shaft 710 and a sub-rear wheel shaft 720. When the bicycle mode is realized, only the main rear wheel shaft 710 is used. When the tricycle mode is realized, the main rear wheel shaft 710 and the sub-rear wheel shaft 720 are connected to a tricycle shaft 800 which will be described later and are used as integral parts.

Therefore, when the bicycle mode is realized, as shown in FIG. 3a and FIG. 3b, both sides of the main rear wheel shaft 710 on which the first rear wheel 711 is rotatably mounted are fitted into the first mounting holes 310 formed in the connection brackets 300. In addition, the main rear wheel shaft 710 has a main sprocket 712 which is drive-connected to the propelling sprocket 31 via a chain. Consequently, driving the propelling sprocket 31 propels the first rear wheel 711 together with the main rear wheel shaft 710.

When the tricycle mode is realized, as shown in FIG. 4 to FIG. 6, the pair of the conversion frames 200 are arranged collinearly with the sub-supports 120 due to manipulation of the first hinge units 600. Consequently, also the pair of connection brackets 300 mounted on the conversion frames 200 are maintained at a preset angle like the conversion frames 200. In this state, the main rear wheel shaft 710 and the sub-rear wheel shaft 720 are fitted into the second mounting holes 320 formed in the connection brackets 300, and the rear wheel shaft 710 and the sub-rear wheel shaft 720 are integrally connected by the tricycle shaft 800. In other words, the main rear wheel shaft 710 and the sub-rear wheel shaft 720 on which the first rear wheel 711 and the second rear wheel 721 are rotatably mounted are respectively fitted into the second mounting holes 320 formed in the pair of connection brackets 300. In addition, one end of the main rear wheel shaft 710 and one end of the sub-rear wheel shaft 720 are connected through the tricycle shaft 800. The tricycle shaft 800 has a shaft sprocket 810 which is drive-connected to the propelling sprocket 31 via the chain. Accordingly, driving the propelling sprocket 31 concurrently propels the main rear wheel shaft 710 and the sub-rear wheel shaft 720, thereby propelling the first rear wheel 711 and the second rear wheel 721.

In the meantime, the main sprocket 712 provided on the main rear wheel shaft 710 is not directly connected to the chain when the tricycle mode is realized. The main rear wheel shaft 710 is provided with a protective cover 713 which propels the main sprocket 712 in cooperation with the tricycle shaft 800 while surrounding and protecting the main sprocket 712 so that the main rear wheel shaft 710 is propelled together with the tricycle shaft 800 provided on the main rear wheel shaft 710. Referring to the structure of the protective cover 713, the inner circumference thereof is engaged with the main sprocket 712.

In addition, like the main rear wheel shaft 710, the sub-rear wheel shaft 720 has a sub-sprocket 722. When the bicycle mode is realized, the sub-sprocket 722 can substitute for the main rear wheel shaft 710 and the main sprocket 712. Likewise, the sub-sprocket 722 provided on the sub-rear wheel shaft 720 is not directly connected to the chain when the tricycle mode is realized. The sub-rear wheel shaft 720 is provided with a protective cover 713 which propels the sub-sprocket 722 in cooperation with the tricycle shaft 800 while surrounding and protecting the tricycle shaft 800 so that the sub-rear wheel shaft 720 is propelled together with the tricycle shaft 800.

Figure 7:
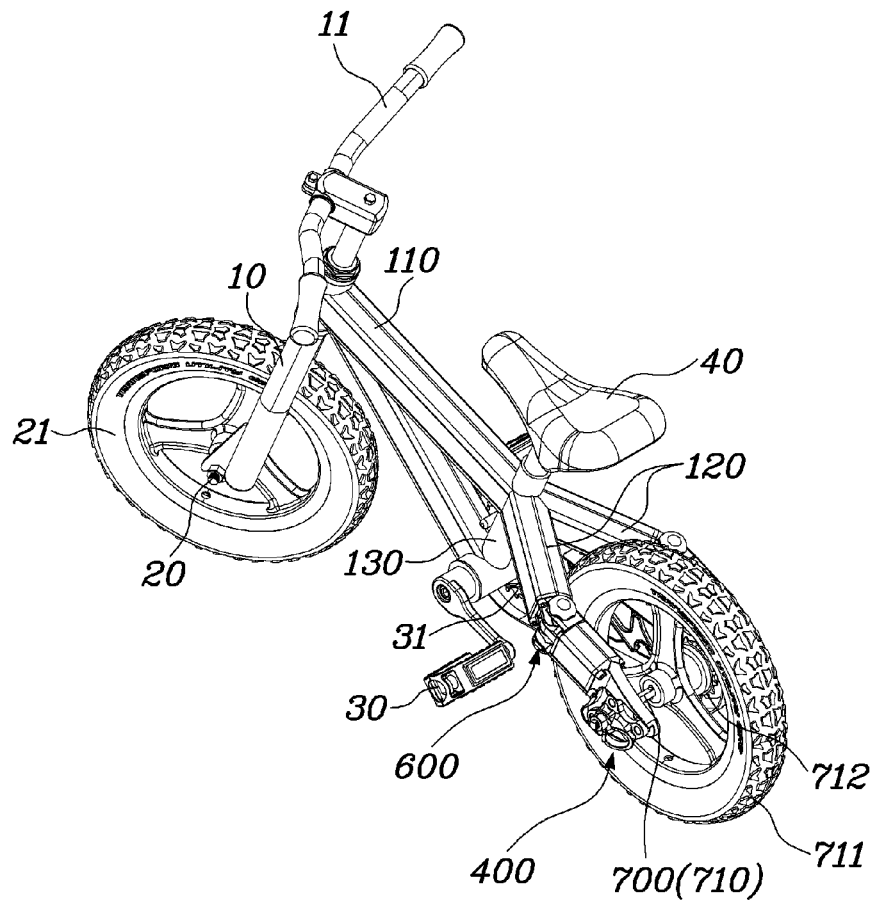
FIG. 7 is a perspective view showing bicycle mode of a cycle capable of bicycle-tricycle conversion according to a second embodiment of the present invention.
Figure 8:
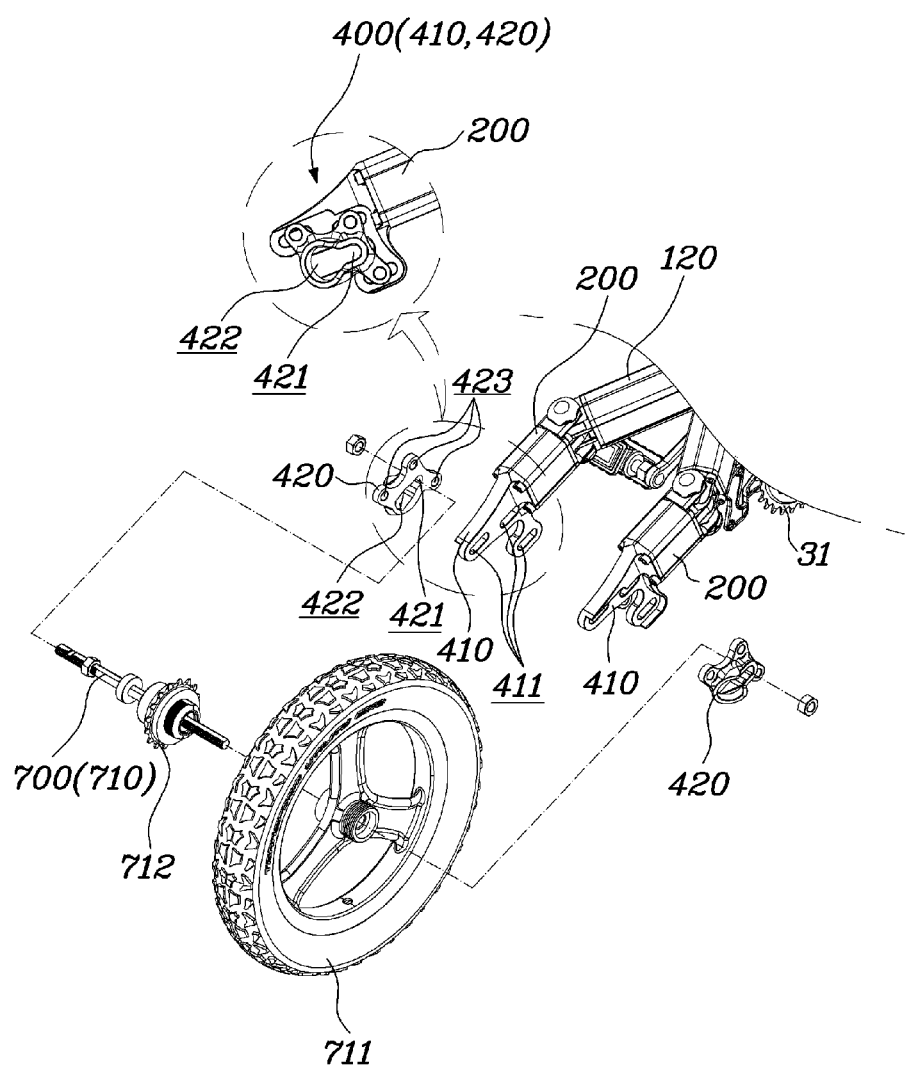
FIG. 8 is an exploded view of key components, showing the bicycle mode of the cycle capable of bicycle-tricycle conversion according to the second embodiment of the present invention.

FIG. 7 and FIG. 8 show a cycle capable of bicycle-tricycle conversion according to a second embodiment of the present invention.

FIG. 7 is a perspective view showing bicycle mode of the cycle capable of bicycle-tricycle conversion according to the second embodiment of the present invention, and FIG. 8 is an exploded view of key components, showing the bicycle mode of the cycle capable of bicycle-tricycle conversion according to the second embodiment of the present invention As shown in FIG. 7 and FIG. 8, the structure of the cycle capable of bicycle-tricycle conversion according to the second embodiment of the present invention is similar to that of the above-described cycle capable of bicycle-tricycle conversion according to the first embodiment, except that the structure of connection brackets 400 is modified such that the tension of the chain is adjustable. Accordingly, descriptions of components of the second embodiment that are the same as those of the first embodiment will be omitted.

Like the connection brackets 300 according to the first embodiment, the connection brackets 400 according to the second embodiment are mounted on the rear end portions of the conversion frames 200 in order to facilitate connection to the rear wheel shaft 700 depending on a change in the angle of the conversion frames 200 when the cycle is converted into a bicycle or tricycle mode. As shown in FIG. 8, each of the connection brackets 400 is provided with a first bracket plate 410 connected to a corresponding rear end portion of the conversion frames 200 and a second bracket plate 420 which is butted to the outer side surface of the first bracket plate 410. The second bracket plate 420 is provided with a third mounting hole 421 and a fourth mounting hole 422 into which the rear wheel shaft 700 is selectively fitted.

Here, the first bracket plate 410 has at least two first connecting holes 411 which have the shape of a long slot extending in the front-rear direction and into which bolts are fastened. The second bracket plate 420 has at least two second connecting holes 423 which are formed at positions corresponding to the first connecting holes 411 and into which the bots are fastened. Accordingly, the position at which the second bracket 420 is fixed is adjustable in the first bracket 410 in the front-rear direction depending on a change in the position at which the bolts are fastened to the first connecting holes 411. The reason why the position of the second bracket plate 420 on the first bracket 410 is adjusted in the front-rear direction in this fashion is to compensate when the distance between the propelling sprocket 31 and the main sprocket 712 in the bicycle mode or the distance between the propelling sprocket 31 and the shaft sprocket 810 in the tricycle mode differs from the length of the chain.

In addition, like the first mounting hole 310 and the second mounting hole 320 according to the first embodiment, the third mounting hole 421 and the fourth mounting hole 422 formed in the second bracket plates 420 can be variously designed such that the inner diameter of the third and fourth mounting holes 421 and 422 corresponds to the outer diameter of the rear wheel shaft. Although the third mounting hole 421 and the fourth mounting hole 422 can be formed at different areas, portions of the third and fourth mounting holes 421 and 422 according to this embodiment are connected to and communicate with each other such that the third and fourth mounting holes 421 and 422 overlap each other. In addition, it is preferred that the central axes of the third mounting hole 421 and the fourth mounting hole 422 be misaligned from each other at a preset angle corresponding to a difference in the angle at which the connection bracket 300 and the rear wheel shaft 700 are disposed in the bicycle or tricycle mode.

FIG. 9 to FIG. 15 show a cycle capable of bicycle-tricycle conversion according to a third embodiment of the present invention.

Figure 9:
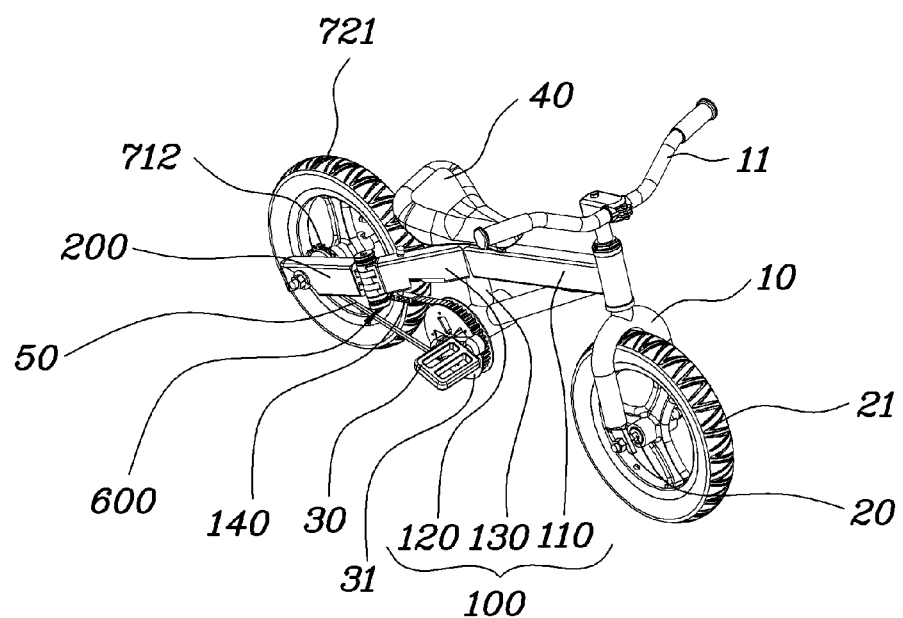
FIG. 9 is a perspective view showing bicycle mode of a cycle capable of bicycle-tricycle conversion according to a third embodiment of the present invention.
Figure 10:
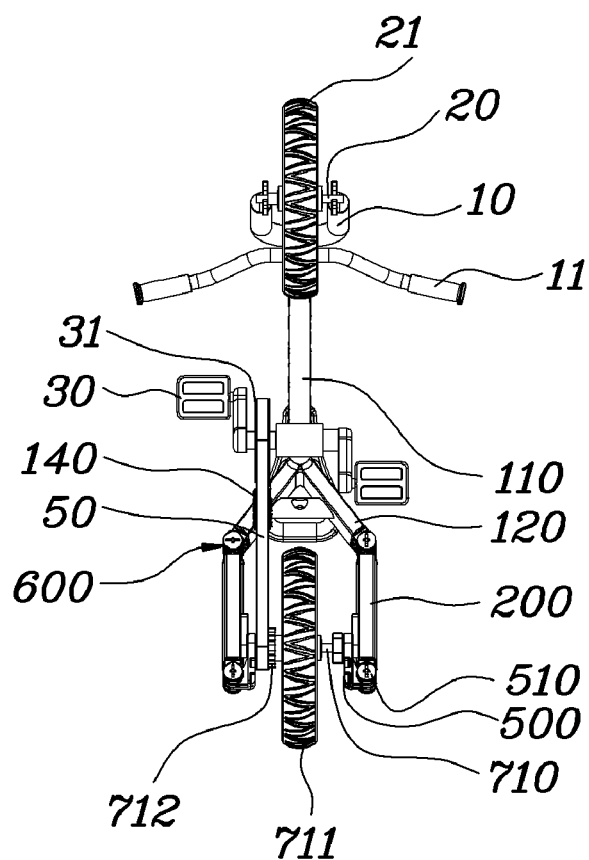
FIG. 10 is a bottom view showing the bicycle mode of the cycle capable of bicycle-tricycle conversion according to the third embodiment of the present invention.
Figure 11:
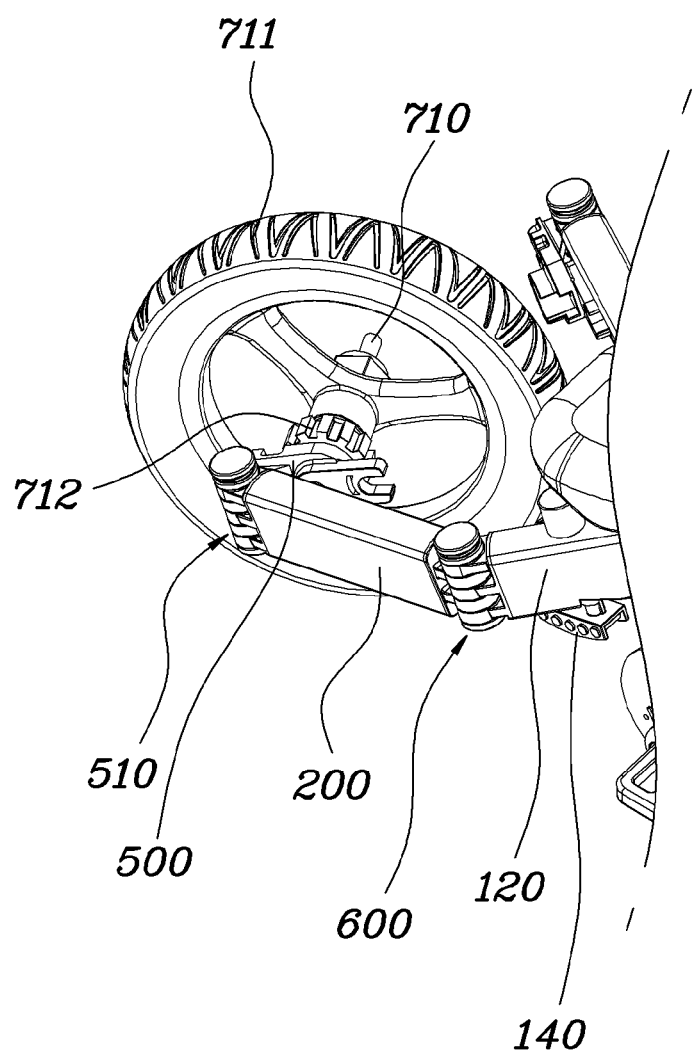
FIG. 11, FIG. 12 and FIG. 13 are exploded views of key components, showing the cycle capable of bicycle-tricycle conversion according to the third embodiment of the present invention.
Figure 12:
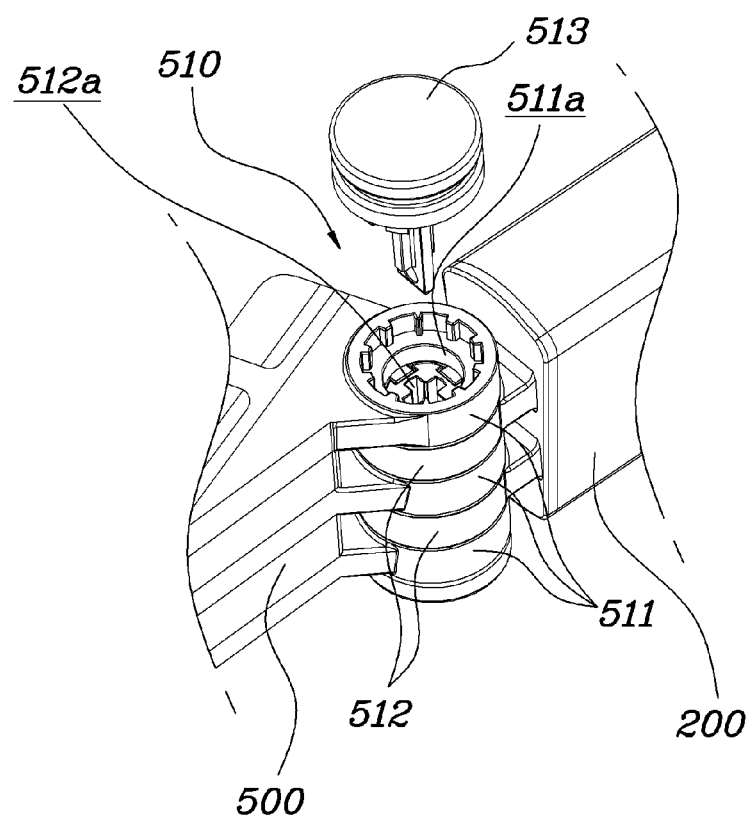
Figure 13:
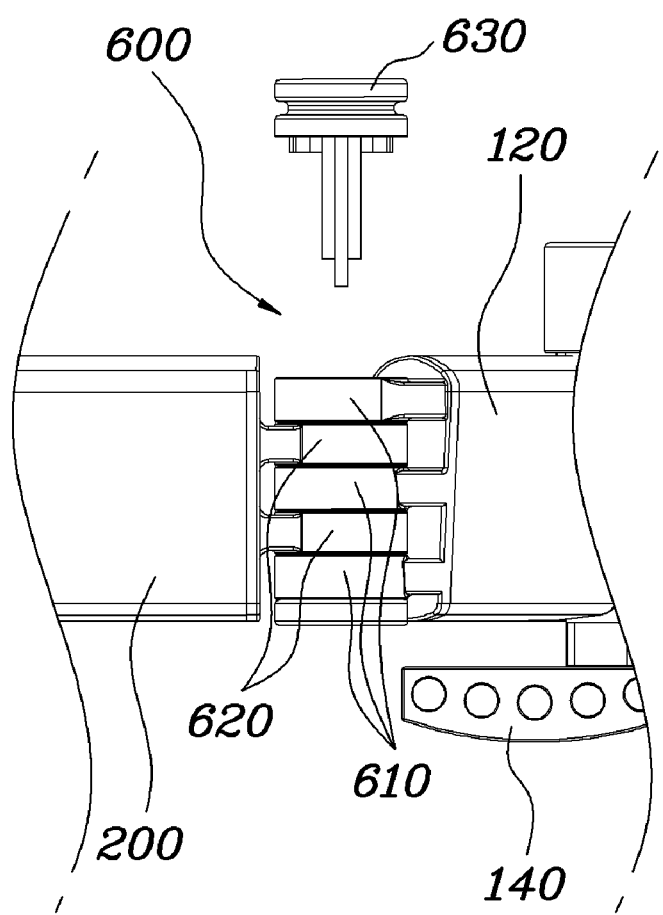
Figure 14:
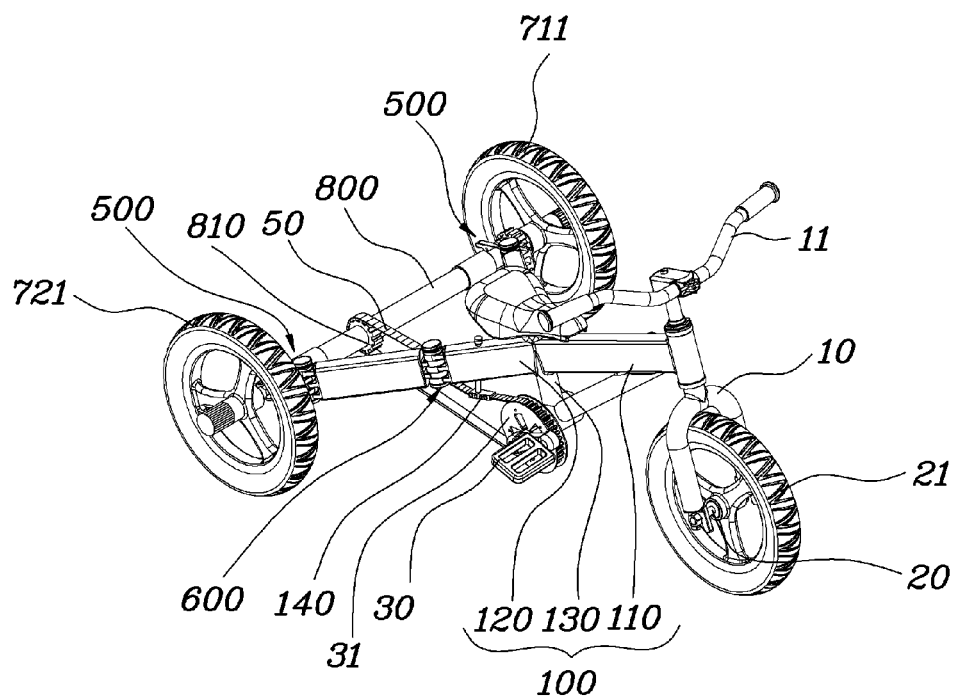
FIG. 14 is a perspective view showing tricycle mode of the cycle capable of bicycle-tricycle conversion according to the third embodiment of the present invention.
Figure 15:
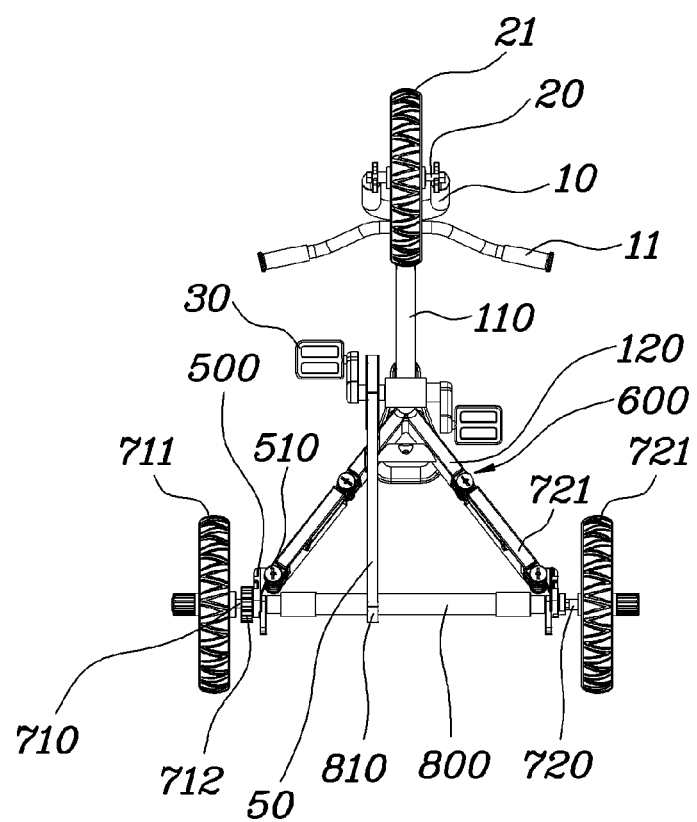
FIG. 15 is a bottom view showing the tricycle mode of the cycle capable of bicycle-tricycle conversion according to the third embodiment of the present invention.

FIG. 9 is a perspective view showing bicycle mode of a cycle capable of bicycle-tricycle conversion according to a third embodiment of the present invention, FIG. 10 is a bottom view showing the bicycle mode of the cycle capable of bicycle-tricycle conversion according to the third embodiment of the present invention, FIG. 11, FIG. 12 and FIG. 13 are exploded views of key components, showing the cycle capable of bicycle-tricycle conversion according to the third embodiment of the present invention, FIG. 14 is a perspective view showing tricycle mode of the cycle capable of bicycle-tricycle conversion according to the third embodiment of the present invention, and FIG. 15 is a bottom view showing the tricycle mode of the cycle capable of bicycle-tricycle conversion according to the third embodiment of the present invention.

As shown in FIG. 9 to FIG. 15, the structure of the cycle capable of bicycle-tricycle conversion according to the third embodiment of the present invention is similar to that of the above-described cycles capable of bicycle-tricycle conversion according to the first and second embodiments, except that the structure of connection brackets 500 is modified such that the connection brackets 500 can be hinged through second hinge units 510 at the rear end portions of the conversion frames 200. Accordingly, descriptions of components of the third embodiment that are the same as those of the first and second embodiments will be omitted.

The connection brackets 500 according to the third embodiment are connected to the rear end portions of the conversion frames 200 via the second hinge units 510 such that the connection brackets can hinge in order to facilitate connection to the rear wheel shaft 700 depending on a change in the angle of the conversion frames 200 when the cycle is converted into a bicycle or tricycle mode. As shown in FIG. 11 and FIG. 12, the rear wheel shaft 700 is connected to the connection brackets 500, which are hinged via the second hinge units 510.

Each of the second hinge units 510 includes a plurality of second sub-pieces 511, a plurality of second conversion pieces 512 and a second holding pin 513. The plurality of second sub-pieces 511 protrude from each rear end portion of the conversion frames 200 such that the second sub-pieces are spaced apart from each other in the top-down direction. Each of the sub-pieces 511 has a second sub-hole 511a in the center portion. The plurality of second conversion pieces 512 protrude from each front end portion of the connection brackets 500 such that the second conversion pieces are spaced apart from each other in the top-down direction, and are positioned between the plurality of second sub-pieces 511 in an overlapping fashion. Each of the second conversion pieces 512 has a second conversion hole 512a in the center portion. The second holding pin 513 extends through the second sub-holes 511a and the second conversion holes 512a, thereby fixing the angle at which the conversion frame 200 and the connecting frame 500 hinge with respect to each other. Here, an elastic member may be provided on each of the second hinge units 510 such that the elastic member is elastically connected to an insertion end of the second holding pin 513. The elastic member maintains the second holding pin 51 in the fixed state at a preset angle of rotation.

Accordingly, when converting from the bicycle mode into the tricycle mode or vice versa, the connection bracket 500 is hinged in the state where the second holding pin 513 inserted into and fixed to the second sub-holes 511a and the second conversion holes 512a is pulled, thereby adjusting the angle at which the conversion frame 200 and the connecting frame 500 hinge with respect to each other. When the angle at which the conversion frame 200 and the connecting frame 500 hinge with respect to each other is properly adjusted, the second holding pin 513 which has been pulled is released and inserted into the second sub-holes 511a and the second conversion holes 512a. At this time, the second holding pin 513 stays in the fixed state under the elastic force of the elastic member after being inserted into the second sub-holes 511a and the second conversion holes 512a.

Although the sub-supports 120 and the conversion frames 200 according to the third embodiment can be connected to each other using the first hinge units 600 as in the above-described first and second embodiments, the connection can be made employing the second hinge units 510 applied between the conversion frames 200 and the connection brackets 300, 400.

In addition, unlike the second embodiment, the third embodiment includes a means for adjusting the tension of the chain.

For instance, a tension-adjusting device 140 which adjusts the tension by pressing the chain 50 can be provided on the rear side of the main frame 100. Accordingly, the tension of the chain 50 can be properly adjusted as the chain 50 is pressed by the tension-adjusting device 140. This tension-adjusting device 140 may also be applied to the first and second embodiments.

Reference will now be made to the process of converting from the bicycle mode into the tricycle mode according to the third embodiment.

Figure 16A:
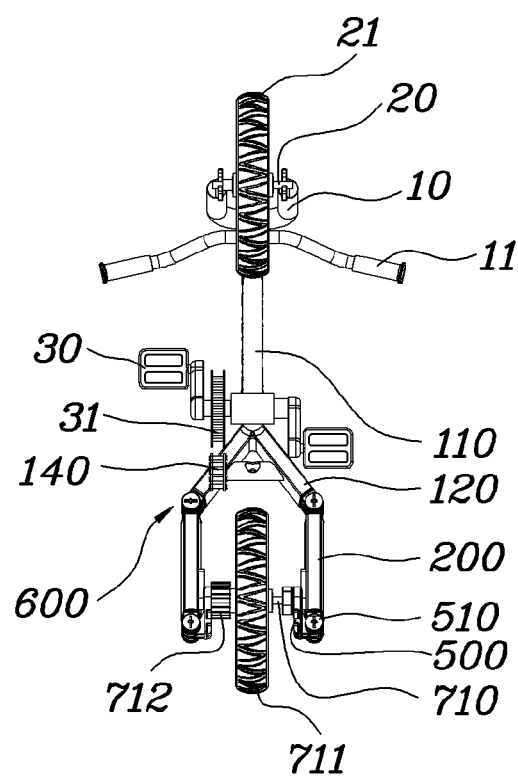
FIG. 16a, FIG. 16b and FIG. 16c are state views showing the process in which the cycle according to the third embodiment is converted from a bicycle to a tricycle.
Figure 16B:
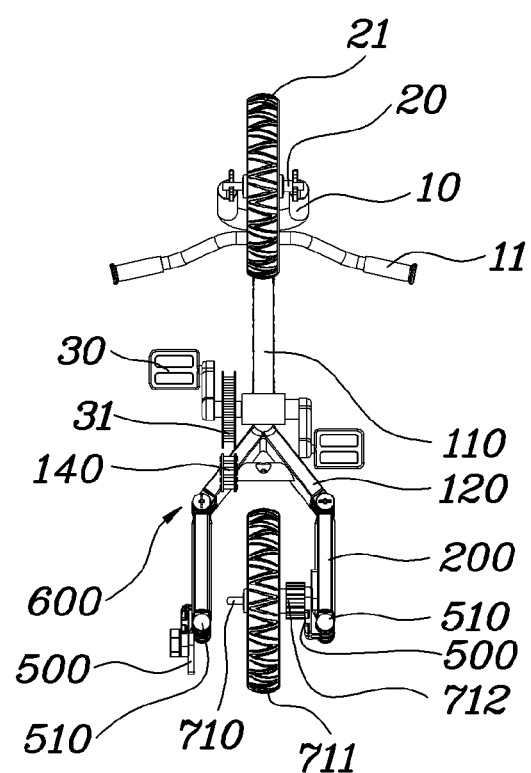
Figure 16C:
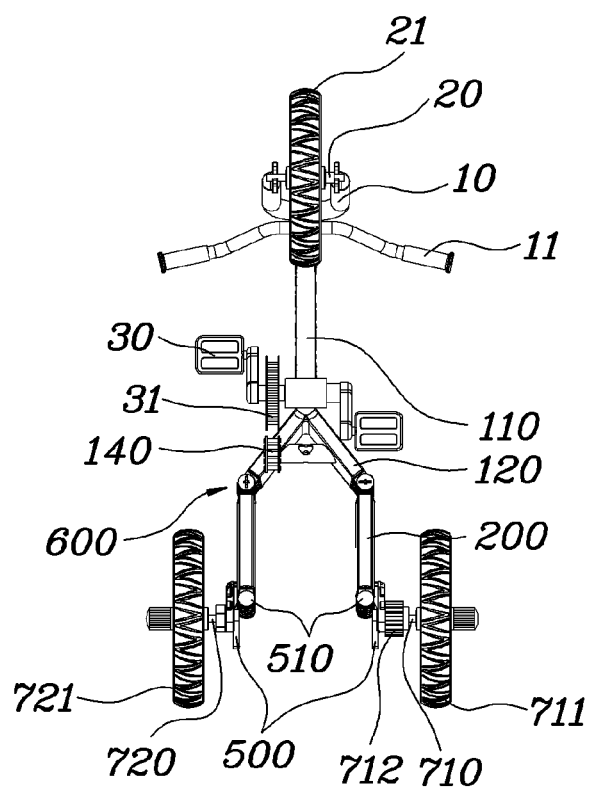

FIG. 16a, FIG. 16b and FIG. 16c are state views showing the process in which the cycle according to the third embodiment is converted from a bicycle to a tricycle.

First, as shown in FIG. 16a, the chain 50 which connects the driving of the propelling sprocket 31 of the propelling pedals 30 and the driving of the main sprocket 712 of the main rear wheel shaft 710 is separated from the cycle. Here, when the tension of the chain 50 is reduced using the tension-adjusting device 140, the chain 50 becomes relatively loose and thus can be easily separated from the propelling sprocket 31 and the main sprocket 712.

As shown in FIG. 16b, when the chain 50 is separated from the cycle, the main rear wheel shaft 710 is separated from one of the pair of connection brackets 500 while the main frame 100, the conversion frames 200 and the connection brackets 500 are hinged so as to be positioned collinear.

As shown in FIG. 16c, when the conversion frames 200 and the connection brackets 500 are hinged, the sub-rear wheel shaft 720 is assembled to one of the conversion frames 200 from which the main rear wheel shaft 710 is separated, and then the tricycle shaft 800 is assembled between the main rear wheel shaft 710 and the sub-rear wheel shaft 720. When the tricycle shaft 800 is assembled, the chain 50 is drive-connected to the shaft sprocket 810 of the tricycle shaft 800 and the propelling sprocket 31 of the propelling pedals 30, and then tension is applied to the chain 50 using the tension-adjusting device 140.

In the case of converting from tricycle mode into bicycle mode, the above-described conversion process is performed in the reverse order.

In the case of the tricycle mode, the present invention can be applied by modifying the structure for use even by a little child who does not have enough ability to operate the cycle.

Figure 17:
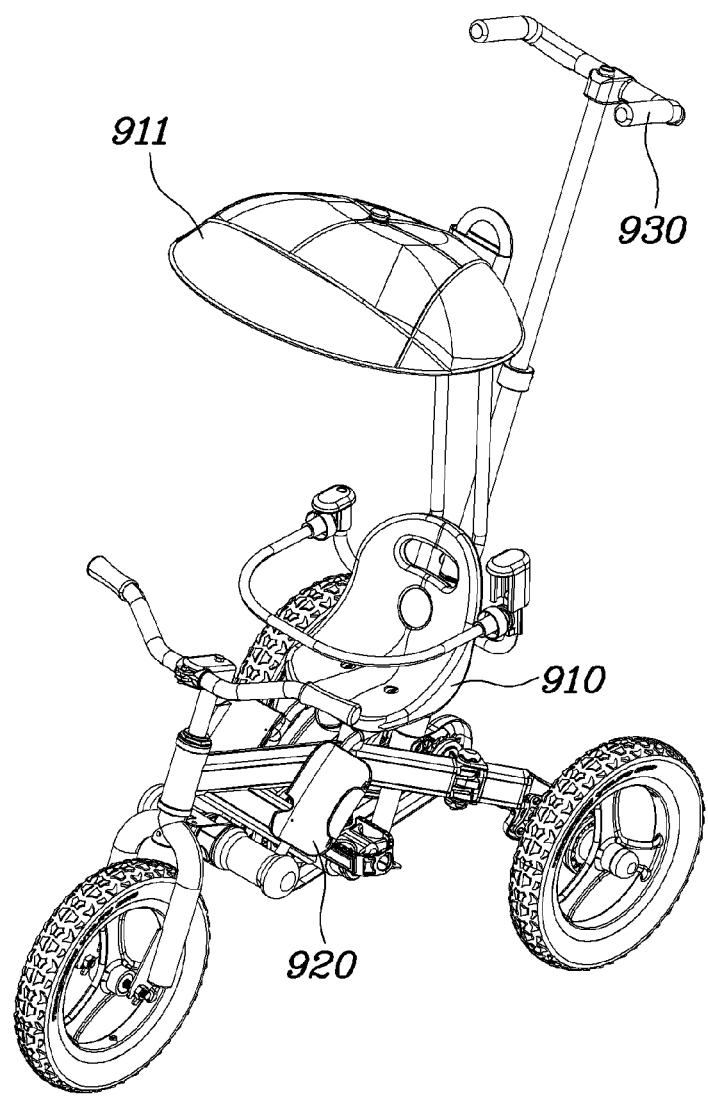
FIG. 17 is a perspective view showing tricycle child mode of a cycle capable of bicycle-tricycle conversion according to a fourth embodiment of the present invention.
Figure 18:
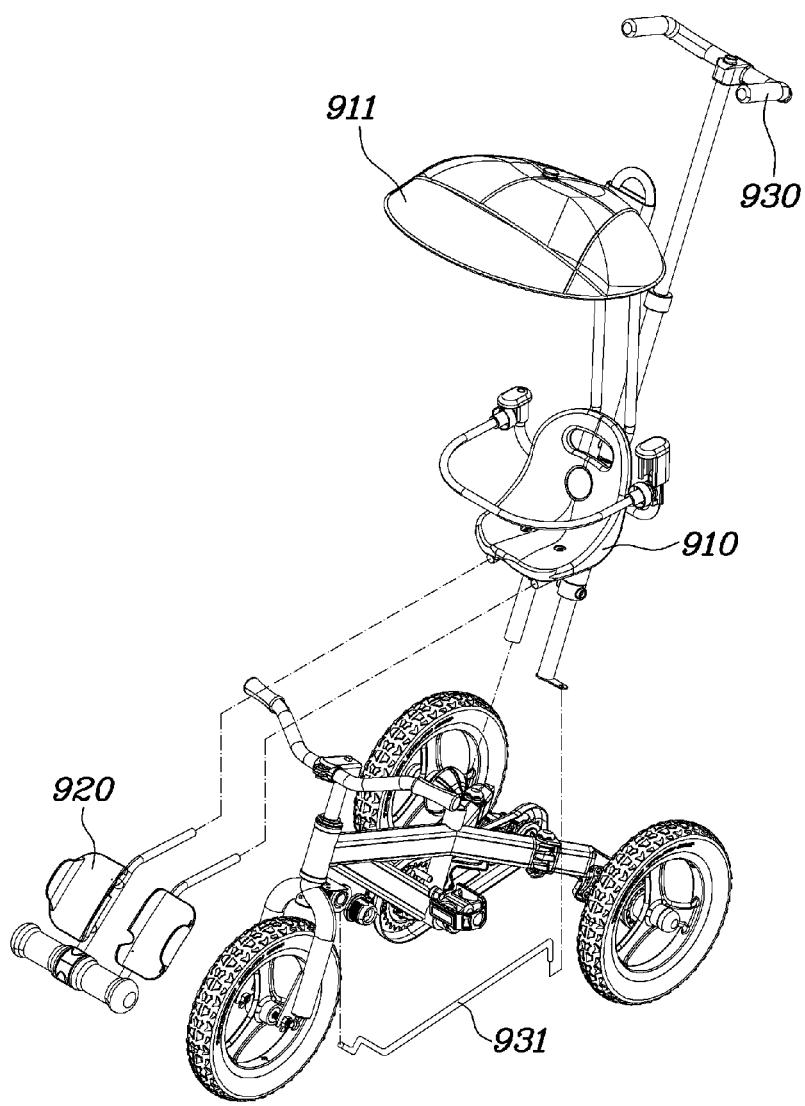
FIG. 18 is an exploded view of key components, showing the tricycle child mode of the cycle capable of bicycle-tricycle conversion according to the fourth embodiment of the present invention.

FIG. 17 is a perspective view showing tricycle child mode of a cycle capable of bicycle-tricycle conversion according to a fourth embodiment of the present invention, and FIG. 18 is an exploded view of key components, showing the tricycle child mode of the cycle capable of bicycle-tricycle conversion according to the fourth embodiment of the present invention.

As shown in FIG. 17 and FIG. 18, the cycle capable of bicycle-tricycle conversion according to the fourth embodiment is a children's tricycle which is based on the tricycle mode of the first to third embodiments. Accordingly, repetitive descriptions will be omitted.

According to the fourth embodiment, a children's seat 910 is mounted on the connecting supports 130 of the main frame 100, and auxiliary footings 920 for children are mounted in front of and below the children's seat 910. In addition, an auxiliary handlebar 930 is mounted behind the children's seat 910 via a connecting rod 931. The fork frame 10 can be steered using the handlebar 930. In addition, a sunshade 911 can be attached to the children's seat 910.

Embodiments of the children's seat 910, the auxiliary footings 920 and the auxiliary handlebar 930 which are used herein are not limited to a specific shape or structure and can be modified into a variety of shapes that can perform respective functions.

In addition, the structure of the present invention can be modified into a baby carriage when embodied in the tricycle mode.

Figure 19:
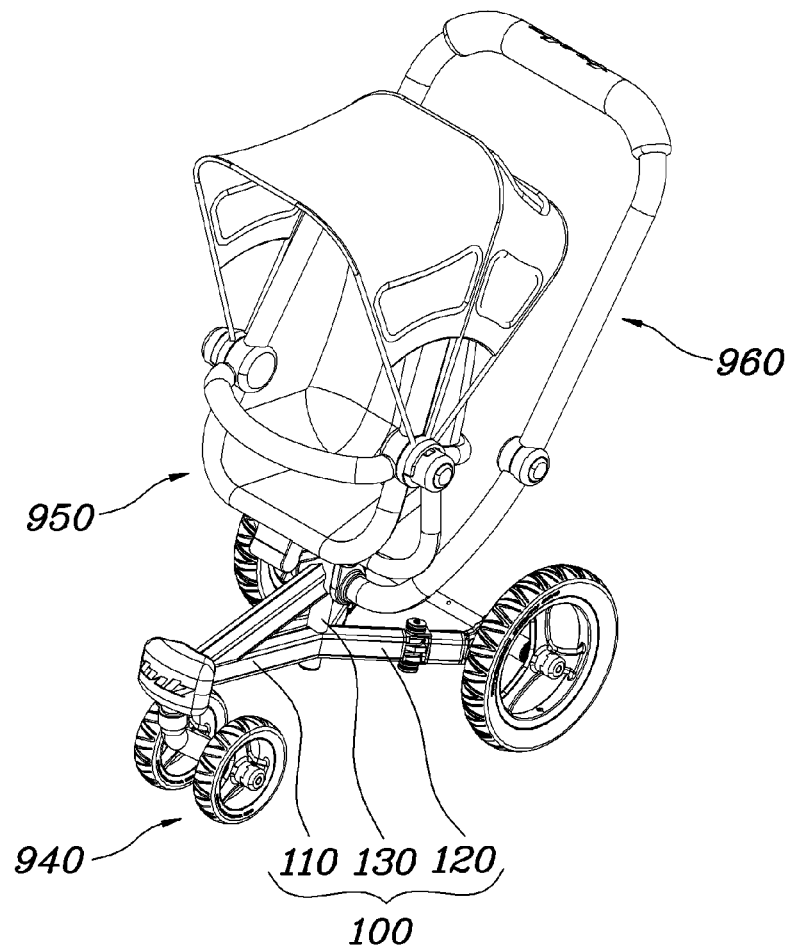
FIG. 19 is a perspective view showing baby carriage mode of a cycle capable of bicycle-tricycle conversion according to a fifth embodiment of the present invention.
Figure 20:
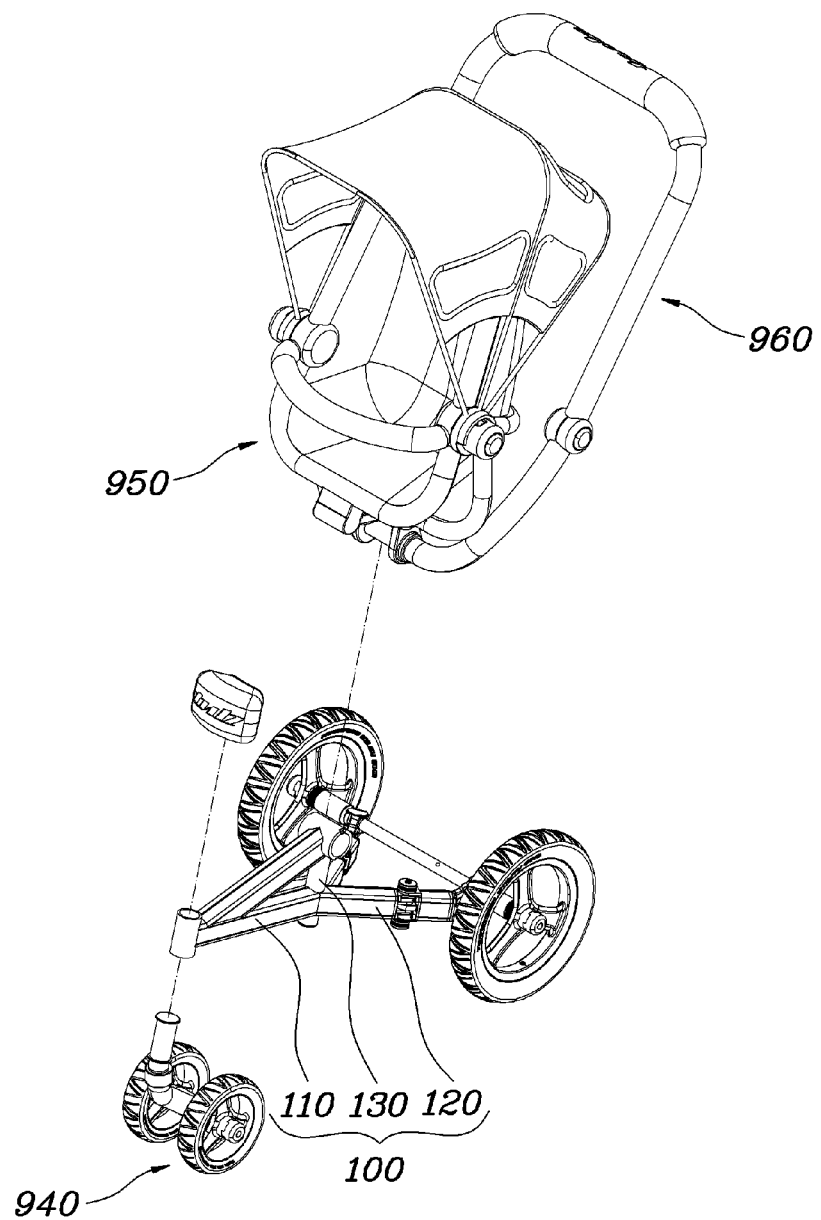
FIG. 20 is an exploded view of key components, showing the baby carriage mode of the cycle capable of bicycle-tricycle conversion according to the fifth embodiment of the present invention.

FIG. 19 is a perspective view showing baby carriage mode of a cycle capable of bicycle-tricycle conversion according to a fifth embodiment of the present invention, and FIG. 20 is an exploded view of key components, showing the baby carriage mode of the cycle capable of bicycle-tricycle conversion according to the fifth embodiment of the present invention.

As shown in FIG. 19 and FIG. 20, the baby carriage according to the fifth embodiment is a baby carriage for an infant, and the structure thereof basically includes the main frame, the conversion frames and the connection brackets which are applied to the tricycle mode of the first to fourth embodiments. Accordingly, repetitive descriptions will be omitted.

According to the fifth embodiment, in the state when the tricycle mode is realized, the fork frame 10 connected to the main frame 100 is removed, and the saddle 40 or the children's seat 910 connected to the connecting supports 130 is removed. In addition, the propelling pedals 30 connected to the main frame 100 are removed. In this state, the main frame 100 is turned upside down.

In addition, auxiliary wheels 940 are connected to the portion of the main frame 100 from which the fork frame 10 is removed. In addition, a baby carriage seat 950 and a baby carriage handle 960 are mounted on the portions of the main frame 100 from which the propelling pedals 30 are removed.

Embodiments of the auxiliary wheels 940, the baby carriage seat 950 and the baby carriage handle 960 which are used herein are not limited to a specific shape or structure and can be modified into a variety of shapes that can perform respective functions.

Although the present invention has been illustrated and described in conjunction with the exemplary embodiments, the present invention is by no means limited to the specific embodiments but should be interpreted by the appended Claims. It will be apparent to a person skilled in the art that a variety of changes and modifications are possible without departing from the principle and scope of the appended Claims.

The invention claimed is:

1. A cycle frame for a cycle capable of bicycle-tricycle conversion, comprising:
a main frame comprising a main support on which a saddle is mounted and a pair of sub-supports branching from the main support;
a pair of conversion frames, a pair of front end portions of the pair of conversion frames being hingeably connected to rear end portions of the pair of sub-supports such that a distance between rear end portions of the conversion frames is adjustable;
a pair of connection brackets respectively connected to rear end portions of the conversion frames, wherein a rear wheel shaft is fitted into the pair of connection brackets;
wherein the connection brackets are connected to the rear end portions of the conversion frames via first hinge units; and
each of the first hinge units comprise a plurality of first sub-pieces protruding in a direction of thickness from a corresponding rear end portion of the rear end portions of the conversion frames such that the first sub-pieces are spaced apart from each other, the first sub-pieces having first sub-holes in center portions thereof, a plurality of first conversion pieces protruding from a corresponding front end portion of the front end portions of the connection brackets in a direction of thickness such that the plurality of first conversion pieces are spaced apart from each other, the first conversion pieces being positioned between the first sub-pieces such that the first conversion pieces overlap the first sub-pieces and having first conversion holes in center portions thereof, and a first holding pin extending through the first sub-holes and the first conversion holes to fix an angle at which a corresponding conversion frame of the conversion frames and a corresponding connection bracket of the connection brackets hinge with respect to each other.

2. The cycle frame according to claim 1, wherein each of the connection brackets has a first mounting hole and a second mounting hole into which the rear wheel shaft is selectively fitted.

3. The cycle frame according to claim 2, wherein portions of the first mounting hole and the second mounting hole are connected to and communicate with each other.

4. The cycle frame according to claim 2, wherein each of the connection brackets comprises a first bracket plate connected to a corresponding rear end portion of the rear end portions of the conversion frames and a second bracket plate butted to an outer side surface of the first bracket plate, the second bracket plate having a third mounting hole and a fourth mounting hole into which the rear wheel shaft is selectively fitted.

5. The cycle frame according to claim 4, wherein the first bracket plate has at least two first connecting holes extending in a front-rear direction into a shape of a long slot, a bolt being fastened into the first connecting holes, and the second bracket plate has at least two second connecting holes formed at positions corresponding to the first connecting holes, the bolt being fastened into the second connecting holes, whereby a position where the second bracket plate is fixed to the first bracket plate via the bolt is adjustable in the front-rear direction.

6. A cycle capable of bicycle-tricycle conversion, comprising:
a main frame comprising a main support on which a saddle is mounted and a pair of sub-supports branching from the main support;
a pair of conversion frames, front end portions of the pair of conversion frames being hingeably connected to rear end portions of the pair of sub-supports such that a distance between rear end portions of the conversion frames is adjustable;
a pair of connection brackets respectively connected to the rear end portions of the conversion frames;

a fork frame rotatably connected to a front end portion of the main support;
a front wheel shaft rotatably connected to the fork frame;
a main rear wheel shaft, both ends of the main rear wheel shaft being respectively connected to the pair of connection brackets such that the both ends are separable from the connection brackets;
a propelling pedal rotatably mounted on the main support and drive-connected to the main rear wheel shaft; and
a sub-rear wheel shaft, wherein, when converted from bicycle to tricycle, one end of the main rear wheel shaft is rotatably connected to one connection bracket of the pair of connection brackets, the other end of the main rear wheel shaft is separated from the other connection bracket of the pair of connection brackets, and the sub-rear wheel shaft is rotatably connected to the other connection bracket of the pair of connection brackets; and
a tricycle shaft, both ends of the tricycle shaft being respectively connected to the main rear wheel shaft and the sub-rear wheel shaft such that the main rear wheel shaft and the sub-rear wheel shaft rotate integrally,
wherein the propelling pedal is drive-connected to the main rear wheel shaft via the tricycle shaft and a chain.

7. The cycle capable of bicycle-tricycle conversion according to claim 6, wherein the propelling pedal comprises a propelling sprocket, and the main rear wheel shaft comprises a main sprocket drive-connected to the propelling sprocket via a chain.

8. The cycle capable of bicycle-tricycle conversion according to claim 6, wherein the propelling pedal comprises a propelling sprocket, and the tricycle shaft comprises a shaft sprocket drive-connected to the propelling sprocket via the chain.

9. A cycle capable of bicycle-tricycle conversion, comprising:
a main frame comprising a main support on which a children's seat is mounted and a pair of sub-supports branching from the main support;
an auxiliary footing for children mounted below and in front of the children's seat;
a pair of conversion frames, front end portions of the pair of conversion frames being hingeably connected to rear end portions of the pair of sub-supports such that a distance between rear end portions of the conversion frames is adjustable;
a pair of connection brackets respectively connected to the rear end portions of the conversion frames;
a fork frame rotatably connected to a front end portion of the main support;
a front wheel shaft rotatably connected to the fork frame;
a main rear wheel shaft connected to one connection bracket of the pair of connection brackets;
a sub-rear wheel shaft connected to the other connection bracket of the pair of connection brackets;
a tricycle shaft, both ends of the tricycle shaft being respectively connected to the main rear wheel shaft and the sub-rear wheel shaft such that the main rear wheel shaft and the sub-rear wheel shaft rotate integrally;
an auxiliary handlebar mounted behind the children's seat, wherein the fork frame is steered using the handlebar via a connecting rod;
a sub-rear wheel shaft, wherein, when converted from bicycle to tricycle, one end of the main rear wheel shaft is rotatably connected to one connection bracket of the pair of connection brackets, the other end of the main rear wheel shaft is separated from the other connection bracket of the pair of connection brackets, and the sub-rear wheel shaft is rotatably connected to the other connection bracket of the pair of connection brackets; and
a tricycle shaft, both ends of the tricycle shaft being respectively connected to the main rear wheel shaft and the sub-rear wheel shaft such that the main rear wheel shaft and the sub-rear wheel shaft rotate integrally,
wherein the propelling pedal is drive-connected to the main rear wheel shaft via the tricycle shaft and a chain.

10. A cycle frame for a cycle capable of bicycle-tricycle conversion, comprising:
a main frame comprising a main support on which a saddle is mounted and a pair of sub-supports branching from the main support;
a pair of conversion frames, a pair of front end portions of the pair of conversion frames being hingeably connected to rear end portions of the pair of sub-supports such that a distance between rear end portions of the conversion frames is adjustable;
a pair of connection brackets respectively connected to rear end portions of the conversion frames, wherein a rear wheel shaft is fitted into the pair of connection brackets;
wherein each of the connection brackets comprises a first bracket plate connected to a corresponding rear end portion of the rear end portions of the conversion frames and a second bracket plate butted to an outer side surface of the first bracket plate, the second bracket plate having a first mounting hole and a second mounting hole into which the rear wheel shaft is selectively fitted.

11. The cycle frame according to claim 10, wherein the first bracket plate has at least two first connecting holes extending in a front-rear direction into a shape of a long slot, a bolt being fastened into the first connecting holes, and the second bracket plate has at least two second connecting holes formed at positions corresponding to the first connecting holes, the bolt being fastened into the second connecting holes, whereby a position where the second bracket plate is fixed to the first bracket plate via the bolt is adjustable in the front-rear direction.

* * * * *